United States Patent [19]
Vertz et al.

[11] Patent Number: 4,762,464
[45] Date of Patent: Aug. 9, 1988

[54] AIRFOIL WITH DIFFUSED COOLING HOLES AND METHOD AND APPARATUS FOR MAKING THE SAME

[75] Inventors: Richard J. Vertz, Congers; Reza K. Mosavi, Monsey, both of N.Y.

[73] Assignee: Chromalloy Gas Turbine Corporation, Orangeburg, N.Y.

[21] Appl. No.: 929,780

[22] Filed: Nov. 13, 1986

[51] Int. Cl.$^4$ .............................................. F01D 5/18
[52] U.S. Cl. .............................. 416/97 R; 29/156.8 H; 219/69 R
[58] Field of Search ................. 416/97 R; 219/69 R, 219/69 M, 69 E, 69 V; 29/156.8 H

[56] References Cited

U.S. PATENT DOCUMENTS

| | | | |
|---|---|---|---|
| 3,538,289 | 11/1970 | Burnet et al. | 219/69 W |
| 3,981,786 | 9/1976 | Andrews | 219/69 W |
| 4,197,443 | 4/1980 | Sidenstick | 219/69 E |
| 4,650,949 | 3/1987 | Field | 219/69 E |
| 4,653,983 | 3/1987 | Vehr | 416/97 R |
| 4,664,597 | 5/1987 | Auxier et al. | 416/97 R |

Primary Examiner—Robert E. Garrett
Assistant Examiner—John T. Kwon
Attorney, Agent, or Firm—Hopgood, Calimafde, Kalil, Blaustein & Judlowe

[57] ABSTRACT

Air cooling of airfoils in a gas-turbine engine is effected through holes which terminate with a diffuser formation at the airfoil surface. The invention is directed to a two-step procedure whereby a laser beam drills the holes very quickly and cost-effectively and whereby an EDM step is relied upon only to form the diffuser shape. The EDM part of the procedure thus occupies but a fraction of the time previously required, and substantial overall economy is realized by integrating these two steps, which are preferably performed in the order stated but which, if desired, may alternatively be performed by laser drilling after EDM formation of the diffuser shape.

4 Claims, 2 Drawing Sheets

AIRFOIL WITH DIFFUSED COOLING HOLES AND METHOD AND APPARATUS FOR MAKING THE SAME

BACKGROUND OF THE INVENTION

The invention relates to the cooling of airfoils of a gas-turbine engine and particularly to an improved method and apparatus for making the same.

U.S. Pat. No. 4,197,443 is descriptive of the purpose and current practice for making cooling holes in turbine blades of the character indicated, wherein the airfoil is hollow and is supplied with cooling air under high pressure, and wherein the cooling holes distribute the cooling air over the active surface of the airfoil, via a diffuser formation extending laterally and downstream from the discharge end of each of a plurality of the cooling holes. The particular technique of said patent involves electric-discharge machining (EDM) wherein a single electrode is so configured as to form both the cooling hole and its diffusion area; the disclosure of the patent also teaches that a single such electrode may comprise comb-like formations whereby a single EDM-machining stroke may develop and form both the hole and the diffuser for each of an arrayed plurality of holes and associated diffusers in a single blade.

Although the indicated method and apparatus produce reliably uniform products, the process consumes excessive time and is therefore relatively expensive.

BRIEF STATEMENT OF THE INVENTION

It is an object of the invention to provide an improved method and apparatus for making air-cooling holes and associated diffuser formations in turbine airfoils of the character indicated.

A specific object is to meet the above object in substantially reduced time, as compared with existing practice.

Another specific object is to meet the above objects and, additionally, to produce a product having superior heat-exchanging properties.

The invention achieves the foregoing objects by resorting to a two-step procedure whereby a laser beam drills the holes very quickly and cost-effectively and whereby an EDM step is relied upon only to form the diffuser shape. The EDM part of the procedure thus occupies but a fraction of the time previously required, and substantial overall economy is realized by integrating these two steps, which are preferably performed in the order stated but which, if desired, may alternatively be performed by laser drilling after EDM formation of the diffuser shape.

DETAILED DESCRIPTION

The invention will be described in detail for a preferred embodiment, in conjunction with the accompanying drawings, in which.

Figure 1:
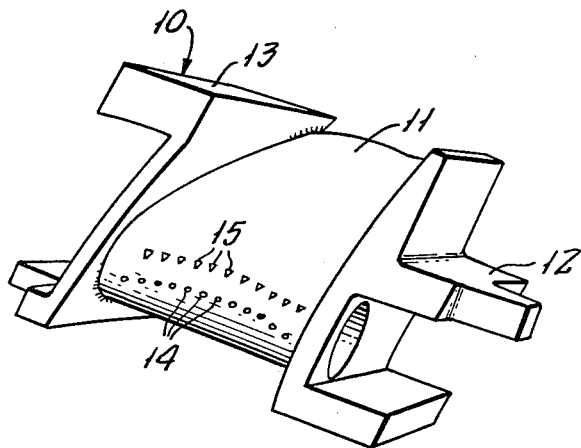
FIG. 1 is a simplified view in perspective showing a stator-blade component of a high-pressure gas turbine, with diffuser-formed cooling holes distributed over a convex part of the airfoil surface thereof.

Referring initially to FIG. 1, the invention is shown in application to a stator-blade component 10 of a high-pressure gas turbine wherein a hollow airfoil 11 is integrally formed with and between a radially inner base or buttress portion 12 and a radially outer base or buttress portion 13. A first array of air-cooling holes 14 is distributed along or near the leading edge of the airfoil, and a second array of further air-cooling holes 15 is similarly distributed along the airfoil in downstream proximity to the array of holes 14, the holes 15 being characterized by downstream-divergent diffuser formations. It will be understood that, in turbine use, high-pressure coolant air is fed from the engine's compressor to the hollow of each blade 11 via ports (not shown), so that the holes 14–15 lay down a protective film of coolant air over the surface of the airfoil, to protect the same against corrosive and other degrading action attributable to high-temperature combustion-gas flow over the airfoil, with the diffuser formations of holes 15 aiding in distribution of the coolant air over the buttress-to-buttress extent of the airfoil. It will also be understood that the hollow interior of blade component 10 may include hollow regions within both buttresses and that the holes 14–15 are to be considered illustrative of cooling holes whether formed in combustion-exposed walls of the airfoil or of the adjacent buttresses.

Figure 2:
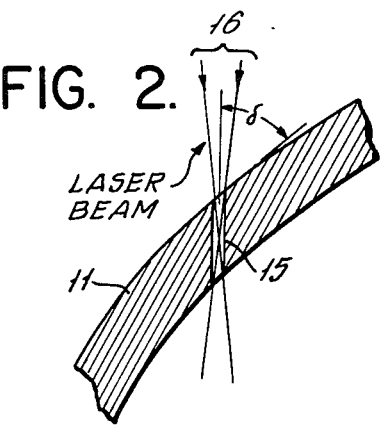
FIG. 2 is an enlarged fragmentary sectional view, to show laser-drilling in the context of a single hole in the wall thickness of the blade of FIG. 1.

In a preferred use of the invention, the first step in forming any of the holes 14–15 is by laser-drilling at a specified local angular orientation, indicated in FIG. 2 as the acute angle δ with respect to the local downstream direction of the convex wall of the airfoil 11. As schematically indicated, the laser beam 16 is slightly convergent at incidence with the convex wall, a preference being indicated that the focal point of beam 16 be in the central region of the involved wall. Components of the laser-drilling apparatus will be discussed in connection with FIG. 7, but it suffices here to state that the laser may be a neodymium-YAG product of Coherent General Corporation, Sturbridge, Massachusetts, delivering 10-Joule pulses of about 600-microsecond duration, and at 2 to 10 Hz repetition rate. It is recommended that the hollow of blade component 11 be prepared for laser-drilling by potting the same with a protective filling of suitable energy-diffusing wax, such as paraffin wax; in this event, and for an illustrative drilled-hole of 0.350-inch path length and 0.020-inch diameter in a 0.220-inch thick wall of MAR-M509 (cobalt/nickel base) alloy blade material, a quick 5-Hz burst of five laser pulses suffices to complete the hole 15, with dissipative absorption of last-pulse energy in the wax, thus protecting the opposite (concave) wall of the airfoil while drilling the convex wall that has been illustratively described.

After all such holes 15 have been drilled, the wax filling should be removed by melting and drainage, and the drilled holes may be inspected, as for conformance to specification. Such inspection, even if visual, such as a spot check of one or two of the holes with a jeweler's loupe, will reveal a certain surface roughness of the bore of each drilled hole; such roughness is characteristic of laser-drilled holes, and the observation of roughness is, at the present stage of development, merely qualitative, being taken in comparison with exterior finish of the airfoil surface. The relative roughness of laser-bored holes, is regarded as advantageous, in that heat-exchange with (i.e., cooling of) the involved locale of the airfoil wall is thereby enhanced.

Figure 3:
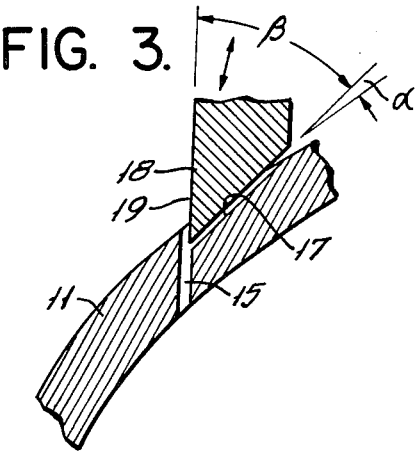
FIG. 3 is a view similar to FIG. 2, to show EDM formation of the diffuser portion of the single hole of FIG. 2.
Figure 3A:
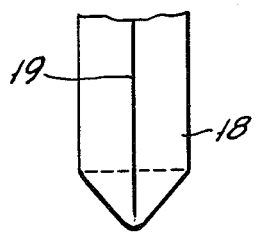
FIG. 3A is a fragmentary view in elevation, for the upstream aspect of the EDM tool of FIG. 3.
Figure 4:
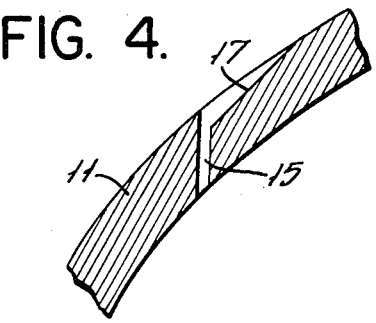
FIG. 4 is a view similar to FIG. 3, to show the hole and its diffuser after EDM-tool removal.

The second step is that of EDM-formation of the diffuser end 17 of each laser-drilled hole 15, as schematically illustrated in FIG. 3, using apparatus to be described in connection with FIG. 7. It suffices to say that in FIG. 3, the EDM process utilizes a single elongate machining electrode 18 (see also FIG. 3A) of generally triangular section, the same being shown truncated at an angle $\beta$ to the longitudinal axis of the electrode. More specifically, what can be identified as the leading or upstream directed edge 19 of this triangular section is preferably rounded, to conform with the radius of bore 15, and the angle $\beta$ preferably conforms to the specified slope of diffuser surface 17 with respect to the axis of drilled hole 15; in FIG. 3, the further angle $\alpha$ expresses the local slope of the diffuser surface 17, with respect to a tangent to the airfoil surface, at intercept with the axis of the involved bored hole 15. The EDM process involves guided and programmed bodily advance of electrode 18 into the airfoil along a predetermined course 20 which may be selected within the angular range $\beta$, as identified in FIG. 3. After EDM completion, tool 18 is retracted, revealing the completed diffuser surface 17 cleanly and smoothly formed as shown in FIG. 4, and with the rounded upstream corner thereof in conformance and communication with the discharge end of the bored hole 15; visual inspection reveals the diffuser surface 17 to be as smooth as the finish of the airfoil surface, and to contrast with the above-noted relative surface roughness of the laser-drilled holes.

Figure 5A:
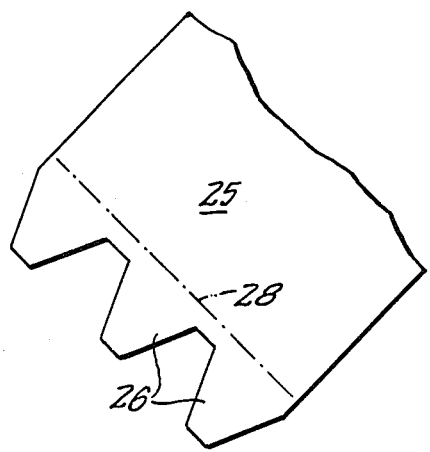
FIGS. 5 and 5A are illustrative of a modification wherein the diffusers of plural adjacent holes are EDM-machined in a single step, the view of FIG. 5 being sectional as in FIG. 3, and FIG. 5A being a plan view of the involved EDM tool.
Figure 5:
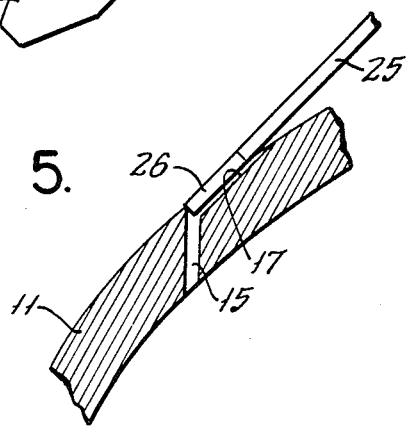

FIGS. 5 and 5A are directed to a modification wherein the EDM-machining tool 25 is a comb-like blank which may be cut from sheet copper and used, in place of the electrode 18, to machine plural diffuser surfaces 17 for an equal plurality of drilled holes 15. For each diffuser surface 17 to be formed in a single EDM-machining stroke, a different one of plural rounded tooth projections will be understood to be positioned and advanced into the airfoil, as on the preselected fixed directional alignment 20.

Figure 6:
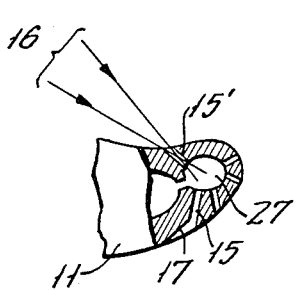
FIGS. 6 and 6A are fragmentary leading-edge sections illustrative of the laser-drilling and EDM-forming of a diffuser-characterized cooling hole in the concave surface of an airfoil.
Figure 6A:
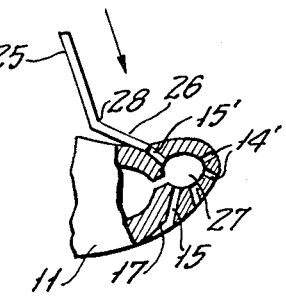

FIGS. 6 and 6A are illustrative of the respective laser-drilling and EDM-machining steps of the invention, in the creation of diffuser-characterized holes 15' in the concave surface of airfoil 11. The hollow interior of the airfoil is seen to include a secondary plenum 27, immediately back of the leading edge of the airfoil with plural holes 14' to deliver cooling air to the leading edge, i.e., forward of the diffuser-characterized holes 15' which are at relatively low-angle incidence to the local concave surface of the airfoil. In this circumstance, a flat multiple-tooth tool 25 will interfere with the concave surface of the airfoil, but if bent, as along the crease alignment 28 suggested in FIG. 5A, the tool 25 may serve to concurrently form plural diffuser surfaces 17, on the concave surface (29) just as readily as on the convex surface illustrated in FIG. 5.

Figure 7:
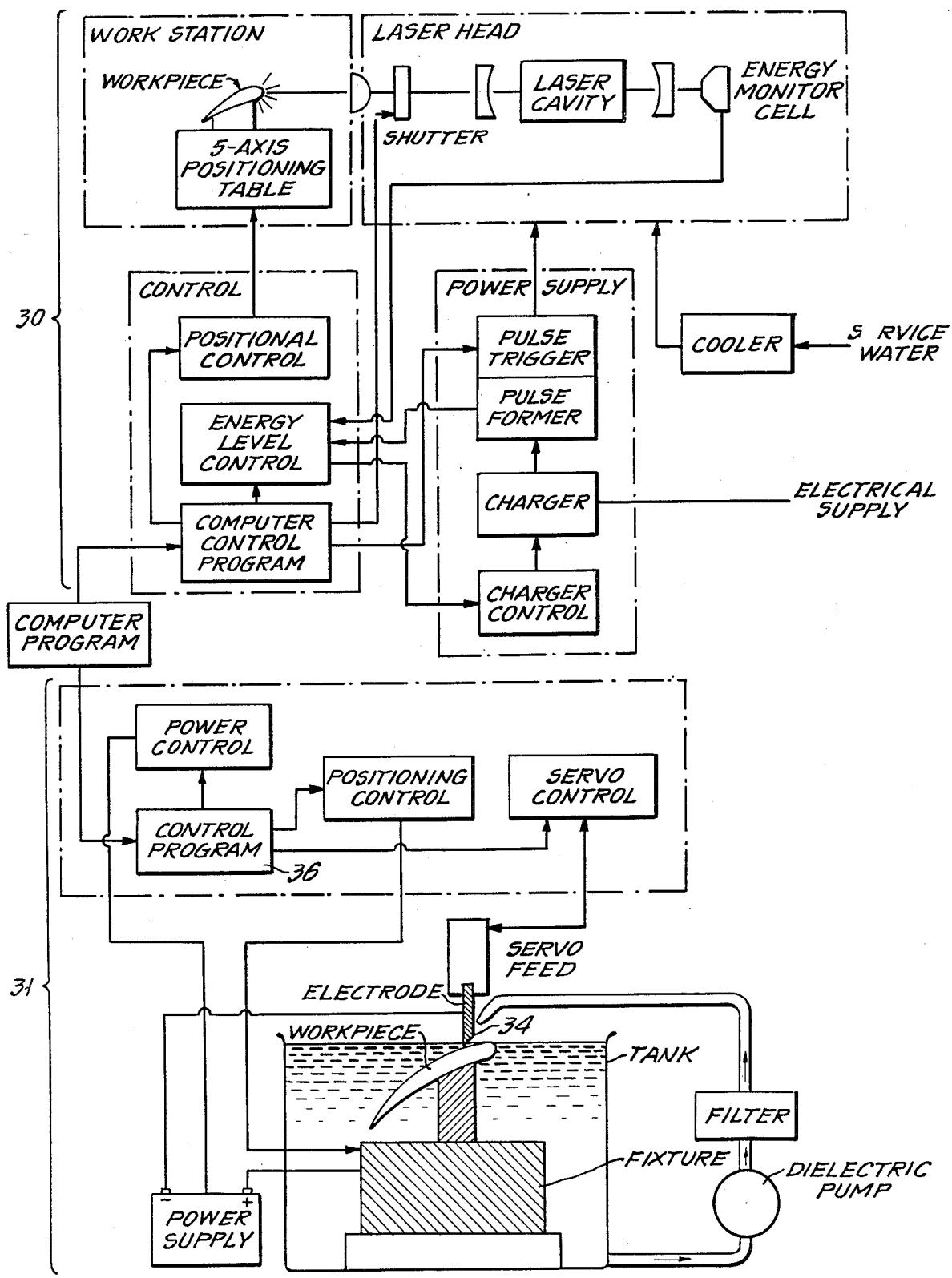
FIG. 7 is a schematic diagram of laser-drilling and EDM-system components used in accordance with the invention.

In the schematic diagram of FIG. 7, the components 30 dedicated to laser drilling and the components 31 dedicated to EDM-machining operations are seen to be integrated, in the sense and at least to the extent that, for a given blade configuration that is to be drilled and diffuser-formed in multiple, a single computer-program means 32 serves for coordinate-position consistency in both procedures. In particular, the fixture identified as a five-axis positioning system 33 shown supporting the workpiece 10 for laser-drilling at work station 34 is to be understood as remaining chucked to the workpiece 10 not only throughout each of a plurality of laser-drilling cycles at computer-controlled indexing and orientation displacements, but also while bodily transferred to the EDM work station where table 33 serves equivalent work-positioning functions. Thus, for mass-production purposes, the fixture 33 is preferably one of a plurality of identical multiple-axis positioning tables for identically supporting identical workpieces, whether mounted at the laser-drilling work station or at the EDM work station.

Legends and interconnections within the laser-drilling half 30 of FIG. 7 are self-explanatory, it being understood that programmed control applies not only to the number of pulses for each hole-drilling burst, but also to the indexing shift of the workpiece (airfoil) via the 5-axis positioning table in the brief dwells between hole-drilling bursts. An energy-monitoring cell senses the level of laser output for feedback control of excitation level, so that the given number of pulses per burst will assuredly drill each specified hole to completion and without damage to the opposite wall of the airfoil. A lens 35 is shown for converging the laser beam to the focal point noted above, namely, preferably at the midpoint of the drilled-hole length. Illustratively, the laser beam at incidence with lens 33 will be collimated, and of 0.5-inch diameter circular section, and lens 33 is of 8-inch focal length; this produces drilled holes of 0.020-inch average diameter, with a slightly "hour-glass" shape.

Legends and interconnections within the EDM-machining half 31 of FIG. 7 are also self-explanatory, it being understood that the supporting "fixture" for the workpiece (airfoil) is preferably identical to the 5-axis positioning system shown in the laser half 30 of the apparatus. In the EDM part of the process, this worktable is submerged with the workpiece in dielectric liquid, which is filtered and circulated for fresh continuous discharge over the machining region. Where the machining electrode 36 is to form a single diffuser profile, it may be as shown and described in connection with FIGS. 3 and 3A, in which case, except for speed, computer control of indexing position and orientation may be identical to that involved in laser-drilling. On the other hand, where tool 36 is formed for multiple-diffuser machining, as shown and described in connection with FIGS. 5, 5A and 6A, the indexing displacements will be larger and fewer in number.

Whatever the choice of EDM electrode, the single computer-program means 32 will be understood to provide, to the control program for the respective computers which govern laser-drilling and EDM operations, a coordinate-position data base which is the common reference for both computers. Specifically, for laser drilling, a first computer 37 utilizes this data base (at 32)

to account for and govern (1) positioning coordinates and orientations of the fixture and workpiece currently mounted at the laser part of the system, as well as (2) laser-energy regulation and the integration of laser energy released for the drilling of each hole; similarly, for EDM machining, a second computer 38 utilizes the same data base (at 32) to account for and govern (1) positioning coordinates and orientations of the fixture and workpiece currently mounted at the EDM part of the system, as well as (2) EDM-tool feeding and power-supply levels.

The invention will be seen to achieve all stated objects, resulting in great economy of multiple-blade quantity production, and also resulting in superior products. And it will be understood that the computer program at 32 may be used to serve multiple EDM systems 31, coordinated with a single laser-drilling system 30 or with multiple laser-drilling systems 30, all dedicated to the quantity production of diffuser-characterized cooling holes for blades of the same design configuration.

While the invention has been described in detail for preferred embodiments, it will be understood that modifications can be made without departing from the scope of the invention. For example, although it is preferred to perform the laser-drilling step first and the EDM operation second, for operations on a given airfoil (workpiece), essentially the same ultimate product may alternatively be the result of EDM formation of the diffuser first and the hole-drilling second.

What is claimed is:

1. A body shell for a gas-turbine airfoil and having one or more cooling holes between an inner surface and an outer surface, each of said one or more holes having a laser-drilled inner bore portion and an EDM-machined outer diffuser portion, whereby the inner bore portion has a surface roughness which substantially exceeds the surface roughness of the outer diffuser portion.

2. An airfoil body shell according to claim 1, wherein the axial extent of said inner bore position is at least one half the space between geometrical intercepts of the bore axis with said surfaces.

3. A body shell for a gas-turbine airfoil and having one or more cooling holes between an inner surface and an outer surface, each of said one or more holes having an inner bore portion and an outer diffuser portion, said inner bore portion being the product of a laser-drilling process and said outer diffuser portion being the product of electric-discharge (EDM) machining.

4. An airfoil body shell according to claim 3, wherein the axial extent of said inner bore portion is at least one half the span between geometrical intercepts of the bore axis with said surfaces.

* * * * *